Nov. 8, 1927.  
W. D'A. RYAN  
HEADLIGHT  
Filed Sept. 2, 1924

Inventor:  
Walter D'Arcy Ryan,  
by Earl F. Pierce  
His Attorney.

Nov. 8, 1927.
W. D'A. RYAN
1,648,198
HEADLIGHT
Filed Sept. 2, 1924   3 Sheets-Sheet 2
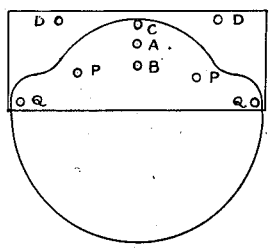
Fig. 8.
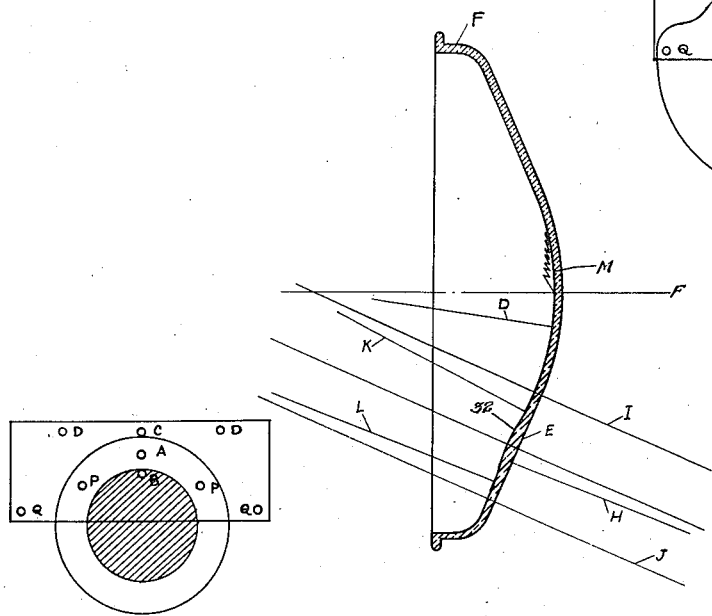
Fig. 3.
Fig. 7.   Fig. 4.
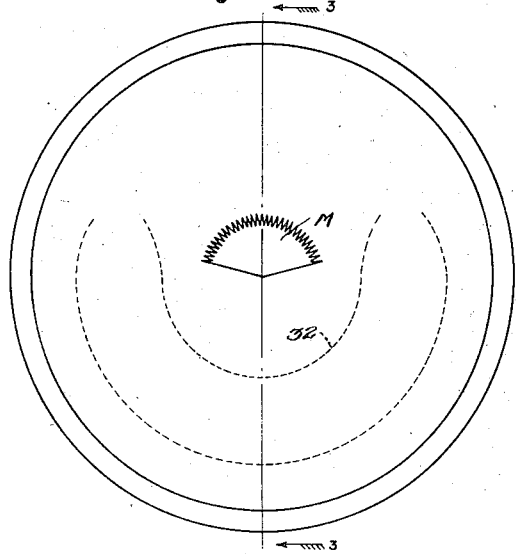
Inventor:
Walter D'Arcy Ryan.
by Earl F. Pierce
His Attorney.

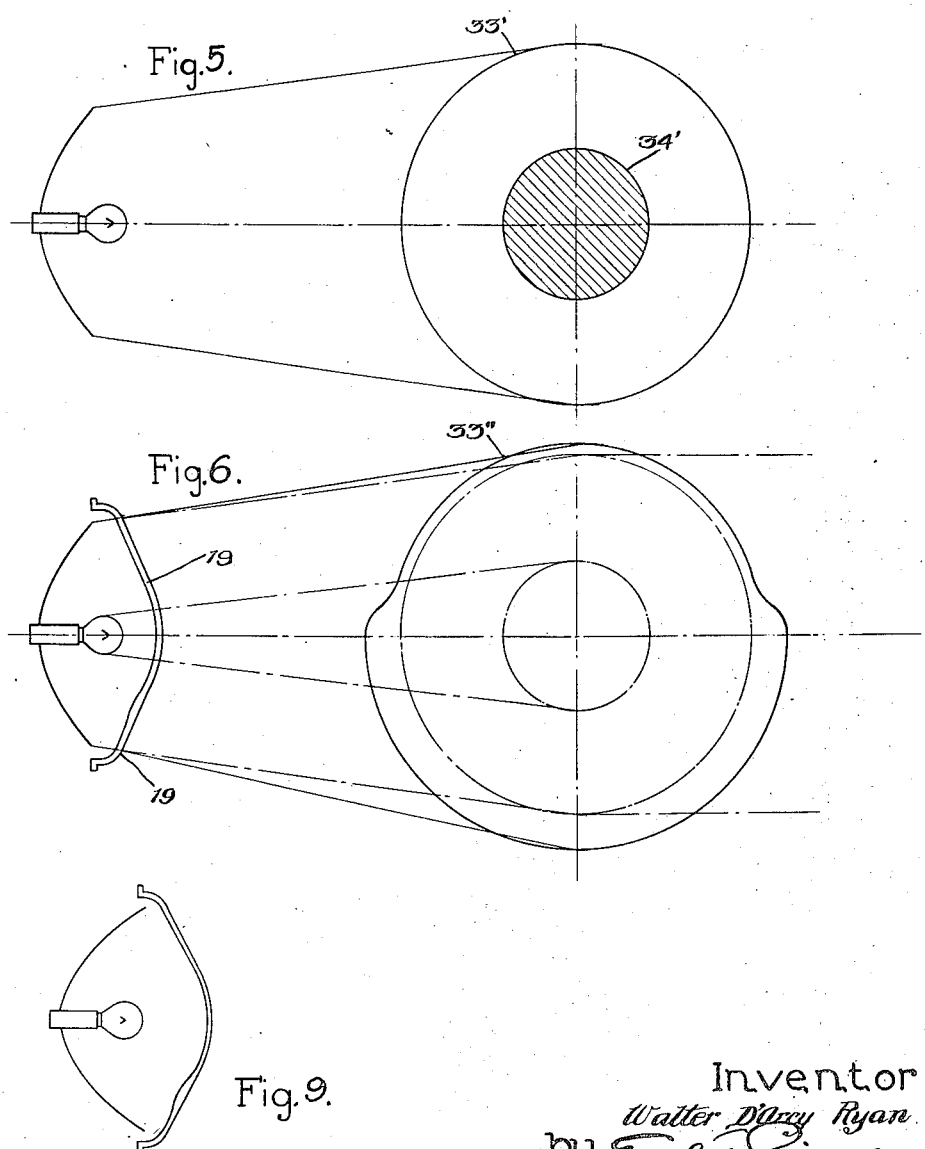

Patented Nov. 8, 1927.

1,648,198

UNITED STATES PATENT OFFICE.

WALTER D'ARCY RYAN, OF SCHENECTADY, NEW YORK.

HEADLIGHT.

Application filed September 2, 1924. Serial No. 735,404.

My invention relates to improvements in headlights, and is particularly concerned with improvements in headlights adapted to be used upon automobiles and other automotive vehicles.

The objects of my present invention are:

First: To provide a headlight comprising a reflector, a source of light and a lens, so arranged and constructed as efficiently to distribute and make use of the light from the source of light.

Second: To provide a headlight of the character described in which as large a portion as possible of the light from the source is thrown into the main beam for illuminating the road-way in advance of the vehicle, while at the same time providing a comparatively wide beam for illuminating the sides of the road-way.

Third: To provide a headlight of the character described comprising means for illuminating the sides of the road immediately adjacent the vehicle, so as to enable the operator to read the mile-posts and other signs at either side of the road.

Fourth: To provide a headlight such as described that will even provide illumination to the rear of the headlight so as to expedite the turning of corners.

Fifth: To provide a headlight comprising means for effecting the above results and at the same time eliminating the glare common to other types of headlights.

Sixth: To provide a headlight comprising means for diffusing the light reflected from those portions of the headlight that are usually productive of glare, so as to eliminate objectionable glare, and at the same time to make use of the diffused light for more effectively illuminating the sides of the roadway, and Seventh: To provide a headlight of the character described that is simple in construction, economical to manufacture, and of rugged construction.

Other objects of my invention will appear as this description progresses, reference being had to the accompanying drawings, in which:

Figure 3, is a central section through the lens of my improved headlight, taken on line 3—3 of Figure 4.

Figure 4, is a front view of the lens.

Figs. 5 and 6 are diagrammatical illustrations explaining the action of the lens when positioned in front of a reflector as described herein.

Figs. 7 and 8 are diagrammatic views making use of charts for explaining the action of the various parts of my improved headlight corresponding to Figs. 5 and 6, respectively.

Figure 9 is a more or less diagrammatic section through a modified form of my invention.

Throughout the several views, similar reference characters are used for referring to similar parts.

Figure 1:
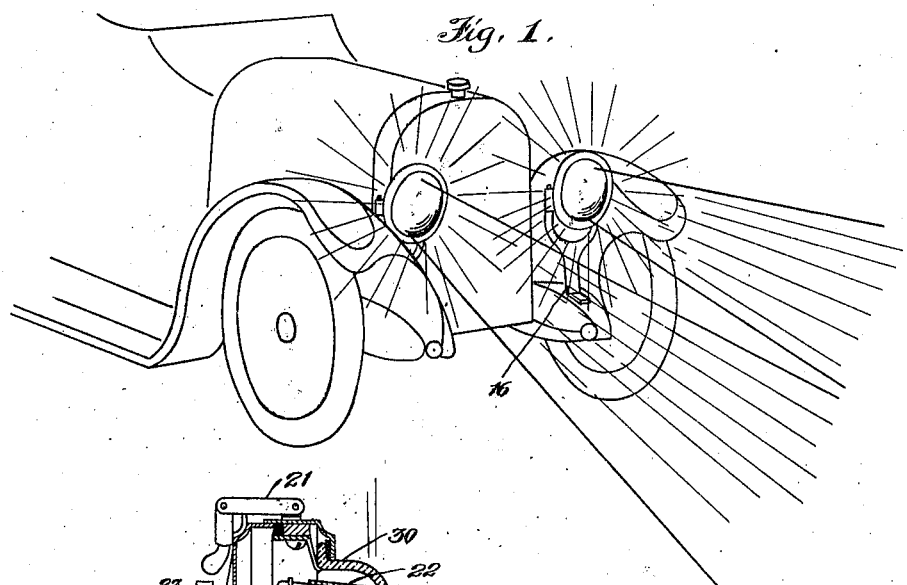
Figure 1 is a perspective view of the front end of an automobile equipped with my improved headlight.
Figure 2:
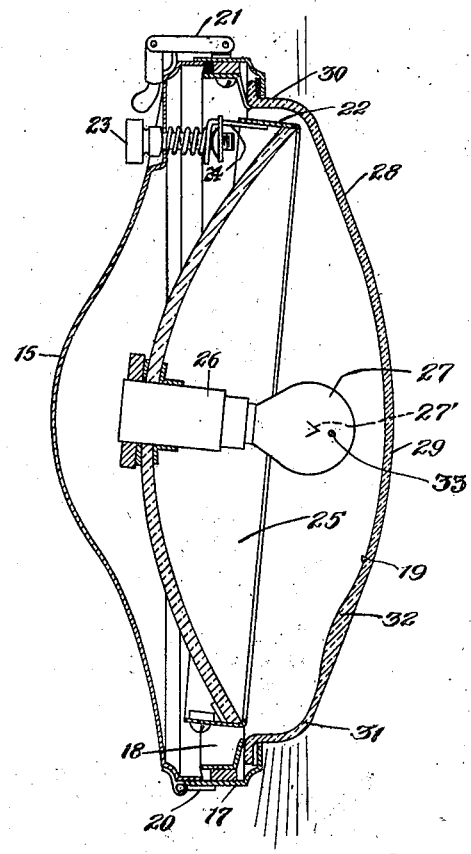
Figure 2 is a vertical section through a headlight embodying my invention.

Referring to the drawings, and for the time being to Figure 2, my improved headlight comprises a casing, or housing 15, that is adapted to be mounted upon a vehicle by any suitable bracket 16. (See Fig. 1.) A door comprising a supporting ring 17, the clamping ring 18, and the lens 19, is suitably secured to the housing 15, by means of hinges 20 and held in closed position by means of a suitable latch 21. The edge of the lens 19, is clamped between the rings 17 and 18. A reflector supporting ring 22 is pivotally mounted in the housing 15 in any desired manner, so as to rotate about a substantially horizontal axis. The reflector is preferably tilted slightly forwardly as shown in Figure 2, and held in adjusted position by means of a screw 23 that has a threaded connection with the bracket 24, carried by the reflector supporting ring 22.

The reflector 25, which may be made of metal, or in the form of a glass mirror, is carried by the ring 22 and provided at, or adjacent, its axis with a suitable socket 26 for receiving and carrying an electric lamp 27, the filament of which forms a source of light for the headlight. Preferably, the socket 26 is so dimensioned, and positioned, as to position the filament 27' slightly out of focus with the reflector 24, because in this manner, I am enabled to materially broaden the beam of light projected by the reflector and to reduce the glare that would result if the filament were positioned at the focal point of the reflector. It should be noted that the reflector 25 has a comparatively long focal length, and that the focal point 33 lies outside of the plane of the edge of the reflector.

The lens 19 is bowl shaped and comprises the conical portion 28, having the substantially spherical central portion 29, and the annular marginal portion or flange 30, that is connected with the outer edge of the conical portion by the curved portion 31.

The inner and outer surfaces of the lens 19, are substantially parallel except that portion of the inner surface that is formed by the crescent shaped lenticular protuberance 32, formed on the inner surface of the lens substantially immediately in front of the side and bottom margins of the reflector. It will be noted from an inspection of Figure 2 that the source of light lies well within the bowl shaped lens so that those rays of light issuing from the source of light may pass through the flange 30, for the purpose of illuminating those portions of the sides of the road immediately adjacent the vehicle, and thus enable the operator to perceive mile-posts and other signs located at the sides of the road. As a matter of fact the source of light is located so far in advance of the plane of the edge of the reflector, and in advance of the front end of the ring 17, that direct rays of light can pass to the rear of the headlight so as to enable the operator more easily to observe a cross road into which he may be turning.

The lens is, as shown in Figure 3, substantially bowl shaped, the outer conical surface being generated by a straight line, inclined to, and rotating around, the axis F. The inner central spherical surface has a radius D, and the outer surface has a similar radius, but slightly longer. The crescent shaped, lenticular protuberance 32 is curved upon the radius H, and the edges thereof gradually merge with the inner surface of the lens through curvatures having the radii K and L. The surfaces described by the radii K and L end at substantially the lines I and J, respectively as shown in Fig. 4, and if desired, the central portion of the lens may be sand-blasted as indicated at M.

Figs. 5 and 6 are useful in explaining the performance of a headlight constructed as described above. In Fig. 5, I have shown a reflector of substantially the same shape as that shown in Fig. 2, with the source of light slightly offset from the focal point of the reflector toward the reflector. The effect is to widen the beam beyond the horizontal as indicated by the circle 33', and to accordingly increase the diameter of the darkened center 34', by reason of the divergent rays due to the relative position of the light source to the focal point. For the purpose of illustration, I have indicated the position of the focal point of the reflector by the numeral 33.

If, now, the lens 19 is placed in front of the reflector as shown in Fig. 6, two results are obtained. In the first place, the beam is still further increased in diameter at its bottom and lateral portions, as shown by the distorted circle 33'' in Fig. 6; and some of the light is deflected through the central portion of the beam to illuminate the dark spot 34' shown in Fig. 5.

The headlight described above will not only adequately illuminate the road-way, but direct rays of light will pass through the marginal portions of the lens and illuminate the sign-posts, and other indicia located along the sides of the road immediately adjacent the vehicle, so as to enable the operator to read there, various signs and indicia. Furthermore, since the source of light is located in advance of the edge of the reflector, a certain amount of light will illuminate areas slightly to the rear of the headlight and thus make it possible for the operator to observe a cross road into which he may be turning.

From the above description it will be apparent that I have provided a headlight in which practically all of the light reflected by the central and upper portions of the reflector is utilized for illuminating the road-way ahead of the vehicle, but in which the light incident upon the lower portion of the reflector and the side portions of the reflector is spread out to provide uniform illumination of the road-way and the sides of the road-way. The crescent shaped, lenticular protuberance 32 not only improves the quality of the illumination of the road-way, but also by its diffusing actions tends to prevent the objectionable glare that is caused by the reflection of the light from the lower portions of the reflectors of headlights of conventional design.

Reference to Figs. 7 and 8 will make the performance of my improved headlight somewhat more clear. Fig. 7 indicates the quality of illumination obtained by the reflector alone without the lens, as illustrated in Fig. 5, and with the reflector tilted to direct the beam slightly below the horizontal, or as shown in Fig. 7 and below the point C. If the lens 19 is positioned in front of the reflector, as shown in Fig. 6, the darkened central area is illuminated and the width of the beam is very materially increased so as to take in the sides of the road as illustrated in Fig. 8, and taken in comparison with the illustration shown in Fig. 7.

Figure 9 discloses a modified form of my invention in which I make use of a deeper reflector equipped with a lens such as described above. By means of this construction I am enabled to produce substantially the same illumination except that there is no illumination to the rear of the headlight and the lateral illumination immediately adjacent the vehicle is not quite as effective as with the arrangement shown in Figures 1 to 4, inclusive.

While I have described the details of construction of the preferred embodiment of my invention, it is to be understood that my invention is not limited to these details, but is capable of other adaptations and modifications within the scope of the appended claims.

Having thus described my invention, what I claim is:

1. A headlight comprising a reflector of long focal length having a focal point outside of the plane of the edge of said reflector, a source of light adjacent the focal point of said reflector, and a bowl shaped lens for said reflector, comprising a conical outwardly convexed portion having a spherical center and flange at its margin substantially parallel with the axis of said reflector, there being a crescent shaped lenticular protuberance on one surface of said lens, curved about the center of said lens, said protuberance being smoothly curved and having its edges merging smoothly with the adjacent surfaces of said lens.

2. A headlight comprising a reflector, a source of light associated with said reflector, and a bowl-shaped lens for said reflector having a conical outwardly convexed portion with a spherical center and a flanged margin extending substantially parallel with the axis of said reflector, there being a crescent-shaped lenticular protuberance on one surface of said lens, curved about the center of said lens, said protuberance being smoothly curved and having its edges merging smoothly with the adjacent surfaces of said lens.

3. A headlight comprising a reflector of long focal length having a focal point outside of the edge of said reflector, a source of light outside of the plane of the edge of said reflector and positioned with respect to said focal point so as to project a divergent beam of light, and a lens adapted to be mounted in front of said reflector having a crescent-shaped lenticular protuberance on one surface thereof, said protuberance being smoothly curved and extending partially about the center of said lens and having its edges merging smoothly with the adjacent surfaces thereof.

In witness whereof, I hereunto subscribe my name this 16th day of August, 1924.

WALTER D'ARCY RYAN.